April 24, 1945.    J. H. STRONG    2,374,627
PARACHUTE CANOPY
Original Filed July 28, 1939    3 Sheets-Sheet 1

Inventor
James H. Strong
By Emery Holcombe Miller
Attorneys

April 24, 1945.  J. H. STRONG  2,374,627
PARACHUTE CANOPY
Original Filed July 28, 1939   3 Sheets-Sheet 2

Inventor
James H. Strong
By Evans Holcombe & Miller
Attorneys

April 24, 1945.  J. H. STRONG  2,374,627
PARACHUTE CANOPY
Original Filed July 28, 1939  3 Sheets-Sheet 3
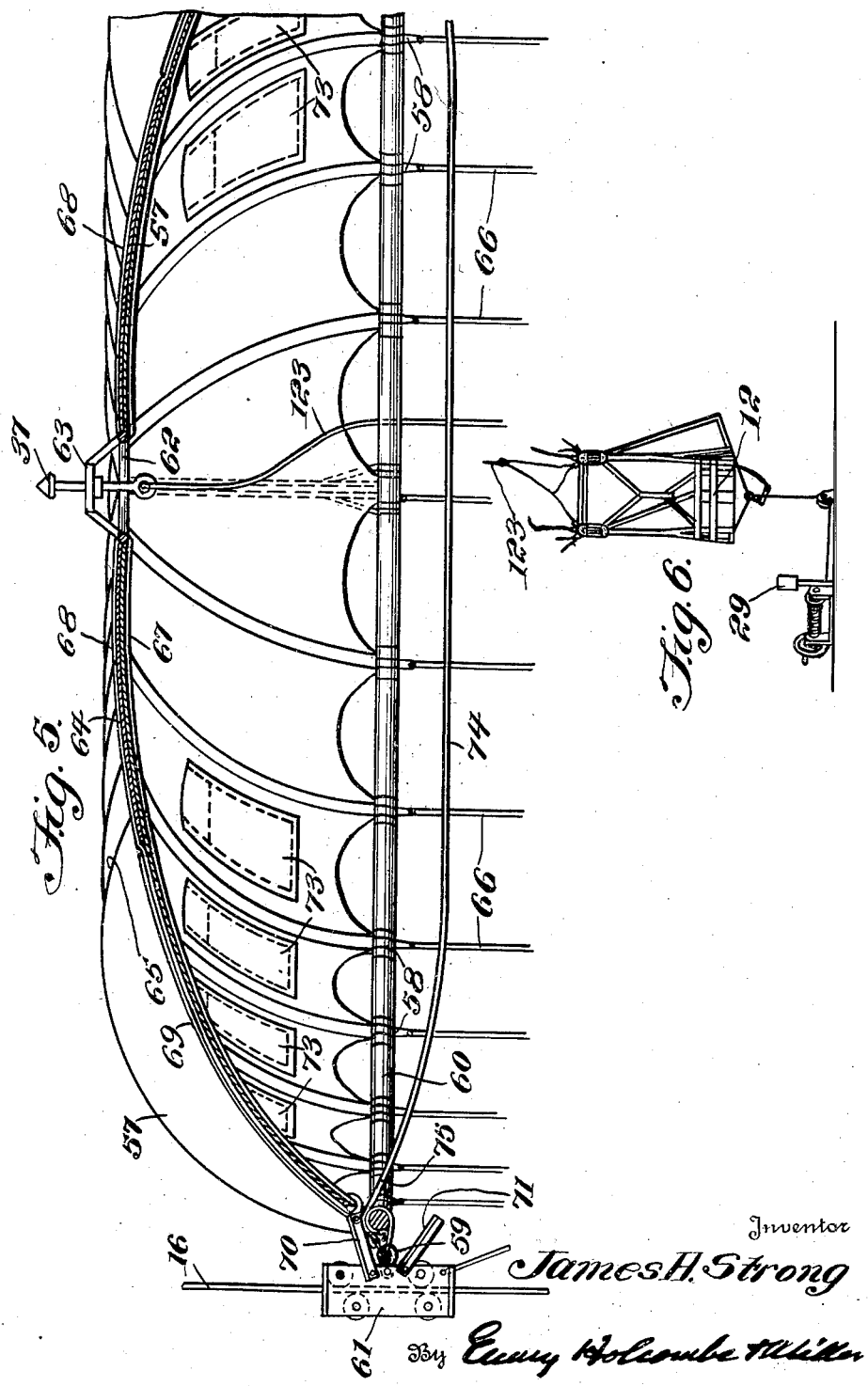
Inventor
James H. Strong
By Emery Holcombe Miller
Attorneys Patented Apr. 24, 1945

2,374,627

UNITED STATES PATENT OFFICE 2,374,627

PARACHUTE CANOPY

James H. Strong, Hightstown, N. J.

Original application July 28, 1939, Serial No. 287,153. Divided and this application June 16, 1941, Serial No. 398,344

13 Claims. (Cl. 244—142)

This invention relates to parachute canopies for amusement and training devices such as shown in my Patent No. 2,183,594, dated December 19, 1939, and is a division of my application Serial No. 287,153, filed July 28, 1939. The invention is not restricted to use with the apparatus disclosed in said patent and application however.

The object of the invention is to promote safety in the use of parachutes in gusty and high winds and under unusual conditions, such as for dropping troops and articles from airplanes travelling at high speed.

The invention comprises a parachute canopy having a series of openings spaced circumferentially between its peak and skirt and covered by valves secured to the underside of the canopy so as to permit air to pass through the openings from above but not from below.

The invention further comprises means associated with the skirt for spreading the canopy while it is secured to the peak supporting means in apparatus such as shown in my patent and application aforesaid.

The invention also comprises the novel details of construction of the parachute canopy hereinafter described, and illustrated in the accompanying drawings.

In the drawings, which show a preferred form of the invention,

Fig. 5 is a cross section on the line 5—5 in Fig. 3, drawn to a still larger scale; and Fig. 6 is a side elevation of the swing in lowered position and the control means for manipulating the apparatus illustrated in Figs. 1 and 2.

Figures 1, 2:
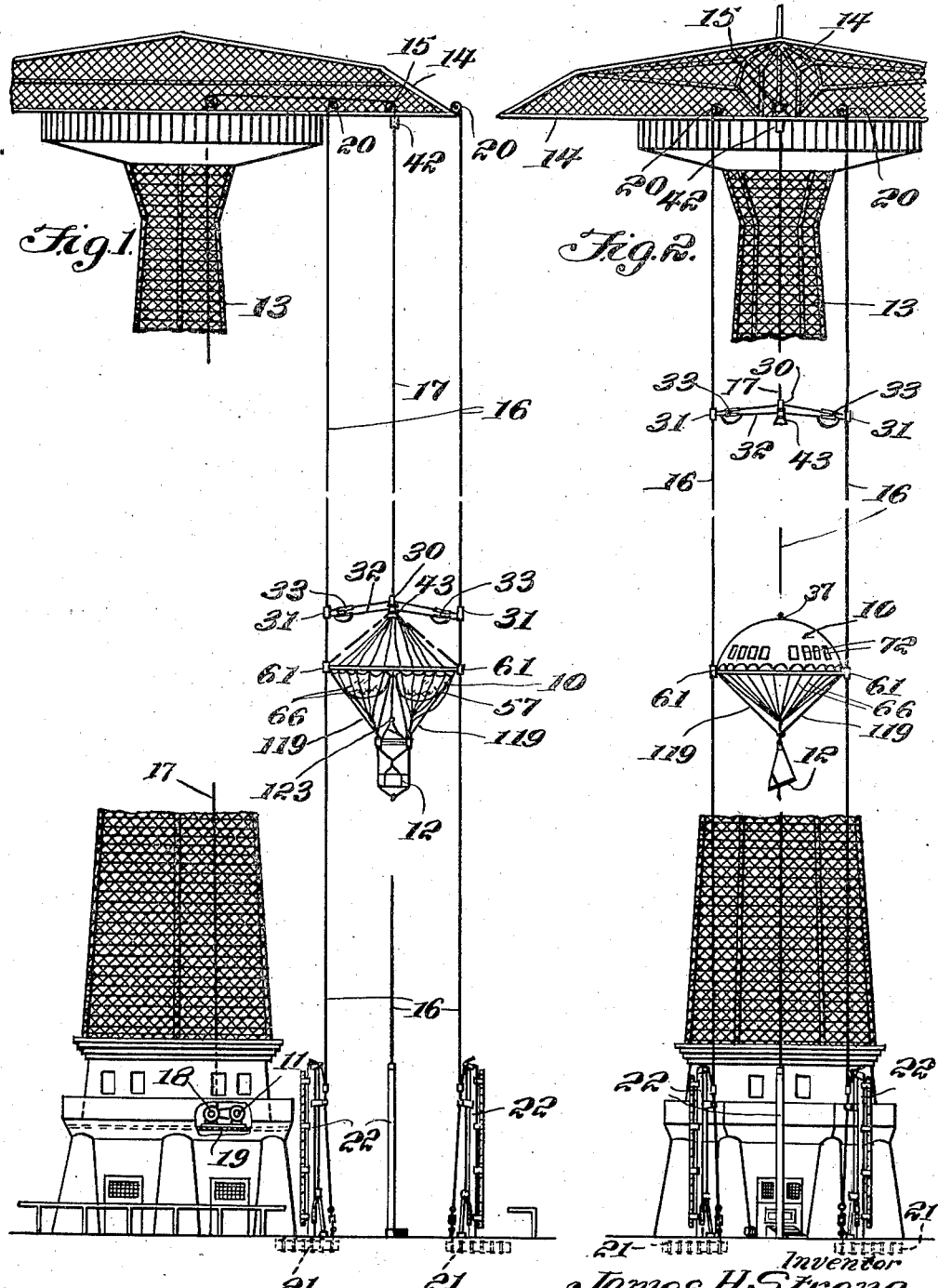
Figs. 1 and 2 are side views taken at right angles to each other of a parachute tower and parachute equipped with a swing for carrying passengers, the parachute in Fig. 1 being shown in the course of an ascent and the parachute in Fig. 2 being shown in the course of a descent.
Figures 3, 4:
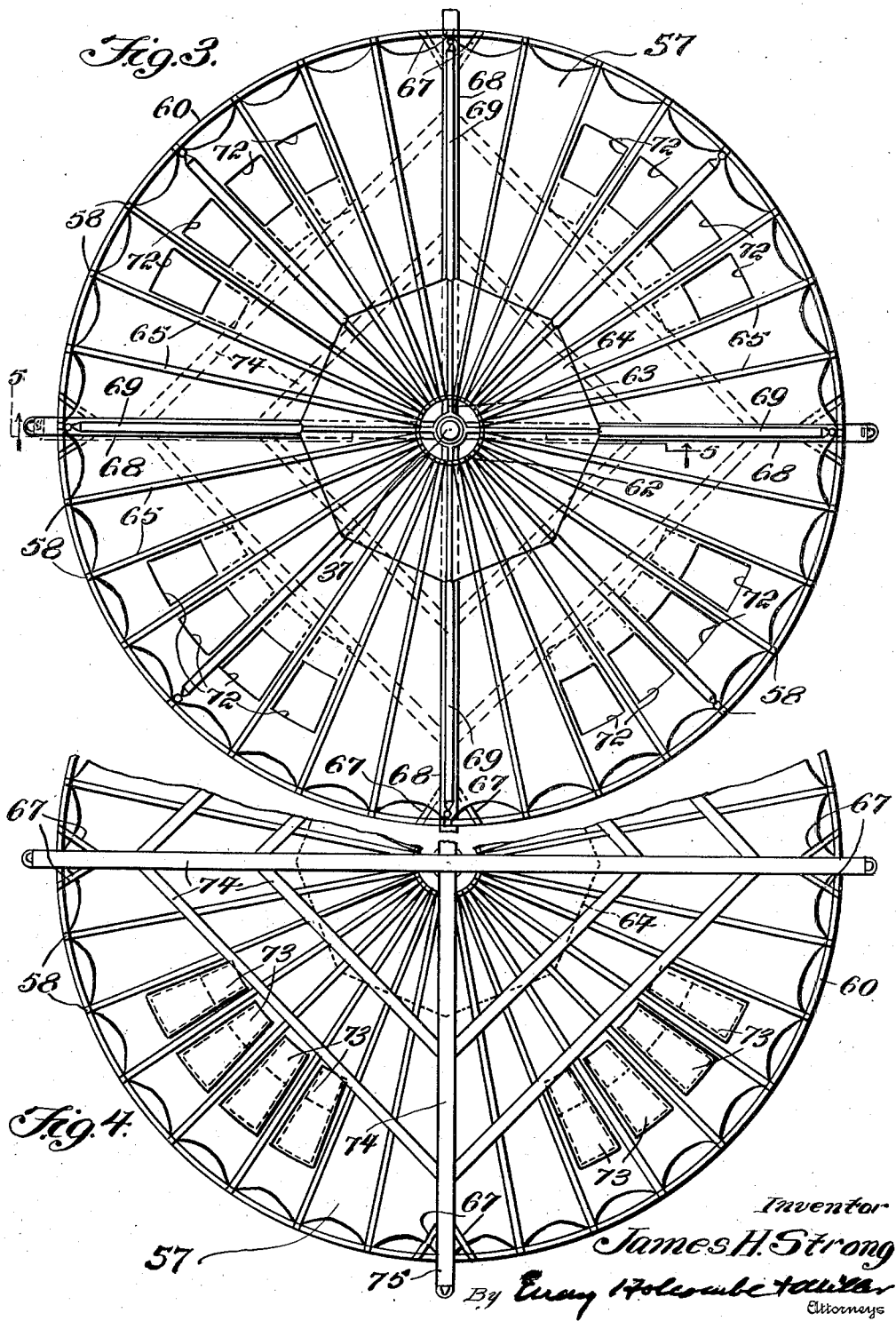
Figs. 3 and 4 are a top plan view of a parachute canopy and a bottom plan view of the same, showing the connections between the canopy and other parts of the apparatus, drawn to a larger scale than Figs. 1 and 2.

The drawings illustrate amusement or training apparatus wherein the parachute is guided both in its ascent and descent by cables, but the invention is applicable to parachutes intended to be dropped freely without any guide means, as in my Patent No. 2,183,594, or from a balloon or moving airplane.

The apparatus illustrated in the drawings comprises a plurality of parachutes 10, each complete with its hoisting motor 11, and a swing 12 for carrying passengers, supported from a suitable tower 13, although only one parachute and operating equipment therefor is shown. The tower is built with arms 14, which project far enough to enable the parachutes and their guiding and operating means to clear the base of the tower, and which support the upper pulleys 15 of the hoisting apparatus and the upper ends of the guide cables 16. The hoisting cables 17 run over the pulleys 15 and down inside the tower to the winding drums 18 of suitable electric hoists provided with brakes and control means which are mounted on an operating platform 19 within the base of the tower.

In the form of apparatus illustrated, there are four guide cables 16 for each parachute 10, the upper ends of which pass over drums 20 on the supporting arm 14 and may be operated to raise and lower the guide cables in case of need. The lower ends of the guide cables are secured to foundation blocks 21 suitably spaced around the base of the tower, and these cables are provided with turnbuckles or other means for tensioning them and keeping them taut so as to prevent undue sidewise movement of the parachute in its ascent and descent. For each parachute there are four cushioning posts 22, mounted alongside the guide cables for catching the parachute at the lower end of its drop. These posts are preferably made of steel tubes or other material having some lateral flexibility, and are tall enough to afford adequate space for bringing the parachute and swing to rest without excessive shock on any part of the apparatus.

The hoisting drums 18 are of standard design and are provided with automatic guides for laying the cables 17 on them as they are wound up and unwound and the usual safety devices. They are driven through suitable reduction gears by electric motors equipped with push-button controlled starting rheostats. Automatic brakes also operated by push-button control means are provided for the hoisting drums. The system comprises a control panel for the motors and another control panel 29, at each ground station, with the necessary electric circuits and power lines, all of this electrical equipment being of approved design, and these parts of the system require no detailed description.

Each hoisting cable is provided at its free end with a head 30 for attaching it to the corresponding parachute and which is guided centrally between the guide cables by means of sliding fittings 31 to which it is connected by steel wires or cables 32 fitted with short sections of rubber cord 33 to give them a limited amount of stretch. The hoisting heads are entirely automatic in their operation; each preferably embodies a grappling and releasing mechanism for engaging a fitting on the peak of the parachute similar to that illustrated in my Patent No. 2,121,413, dated June 21, 1938, for an automatic releasing device, together with a safety device connected to brakes on the sliding fittings 31 for arresting its descent should the hoisting cable break or give way.

Each parachute comprises a canopy 57 which is removably secured to a steel spreader ring 60 around its perimeter by means of straps 58 or other suitable fastenings, and this ring is attached by snap hooks 59 at four points to guide blocks 61 slidably mounted on the guide cables 16. The canopy is provided at its peak with a ring 62 carrying a spider 63 having a central lifting post 37 projecting up sufficiently for the jaws of the hoisting head to engage under its shouldered upper end, and is tapered to enter the guide cone 43 with which the hoisting head is provided.

The peak of the canopy is strengthened by fabric reinforcement 64 surrounding and attached to the ring 62, and by radially extending strips 65 of webbing or other strong material following the lines of and covering the shrouds 66 on the exterior of the canopy. In lieu of shroud lines running along the two principal diameters of the canopy at the ends of which the guide fittings 61 are attached, webbing strips 67, 68 connect the peak ring with the spreader ring, the strips 67 being secured on the inside of the canopy from peak to skirt and bifurcated at the lower ends where they engage the ring. The four outside stays 68 which lead to the guides 61 are left unattached to the skirt for a distance inwards near their outer ends, and flat rubber cords 69 are connected across the intervening space, their ends being securely fastened to the stays. Arms 70 provided with snap hooks project inwards from the guide blocks 61 above the connections for the ring 60 and are adapted to receive and hold the rings upon the ends of the strays 68 when the parachute is rigged. The rubber cords 69 are enough shorter than the adjacent portions of the stays 68 to take up the slack in the stays when the canopy is not fully inflated by its descent through the air, and serve to maintain the peak portion substantially flat and concentric with the principal axis of the hoisting cable about which the four guide cables are symmetrically disposed. The lower arms 71 on the guide blocks support the stiffening or spreader ring in concentric relation to the other parts of the apparatus when the parachute is not inflated.

The parachute canopy is provided with one or more series of circumferentially disposed narrow openings 72 constituting automatic valves positioned in the middle area and near the perimeter of the skirt, and which are normally closed in the fully open position of the canopy by fabric covers 73 or pockets attached to its under side. These pockets are of greater length than the openings which they cover and are attached thereto along their sides and lower edges and are unattached along their upper edges, the inner ends of the pockets being open to provide a channel from each opening to the under side of the canopy. The shape, number and arrangement of these valved openings is such as to relieve external air pressure on the canopy during its upward movement and while it is being held stationary in vertically extended position, thereby largely preventing bellying inwards and violent flapping of the canopy during the time when it is not freely dropping.

A supporting harness or catcher 74 made of strips of suitable material stitched together in the form of cross stays and diagonal stays is secured to the guide fittings 61 in the space beneath the canopy to prevent the canopy from sagging when not inflated. Short strips of webbing 75, connected to the cross stays and the ends of which are provided with rings which engage in snap hooks on the inner sides of the guide fittings, hold the harness taut at all times.

The swing and passengers are suspended from the parachute directly by the shrouds 66, and also from the guide cables 16 and spreader ring 60 by the short cables 119 which are connected at their upper ends to the guide blocks 61. As each canopy skirt spreader ring 60 is strapped to the guide blocks so as to be held in place between the arms 70 and 71 which project inwardly far enough to engage above and below the spreader ring, the failure of one or two fittings or cables will not permit the swing to break away from the parachute, which is attached to the spreader ring by straps at the end of each gore seam and to the guide fitting by the stays 68, even should the ring itself break.

For elevating the swing when the parachute is deflated, a separate bridle 123 is provided, the upper end of which is attached to the center post 37 in the peak of the parachute, and the lower ends of which are attached to the swing suspension means. This bridle is made just long enough to carry the weight of the swing when the parachute is extended vertically by the hoisting means without putting any strain on the suspension cables or shrouds, so that when the parachute is inflated the bridle will be slack.

When all is ready for an ascent, the hoisting motor is started by pressing the starter button on the control panel and the parachute and swing are elevated until the hoisting head engages the tripping member 42 on the arm overhead, which releases the parachute. Limit stops on the hoisting drum stop the motor automatically at this point. As the parachute descends, the hoisting motor is reversed by the attendant pressing the down button on the control panel, thereby lowering the hoisting head by its cable until it engages and picks up the parachute peak fitting at the level of the tops of the posts 22.

When the parachute starts to drop, the valve openings 72 are immediately closed by the pockets 73 and it inflates fully in about twenty feet of free drop and thereafter controls the speed of descent to between twenty-five and thirty feet per second, depending upon the load and air conditions. These valve openings 72 permit the parachute to be hoisted without bellying and slatting against the guide cables even in a variable wind of considerable strength.

The parachute canopy may advantageously be applied to a free parachute as illustrated in my Patent No. 2,183,594, for which purpose it is well suited because of the valve openings 72, which prevent the canopy from being caught by updrafts or eddies due to variable wind conditions and caused to foul the spreader ring or releasing hooks.

Also it is found that free parachutes packed for dropping from airplanes are quicker to open and more dependable when provided with valved canopies according to my invention, and such use is contemplated as within the scope of the invention.

The invention is not restricted to the particular design shown in the drawings, as it is contemplated that changes in the arrangement and details of construction will be necessary to suit manufacturing conditions and locations, and variations in the manner and kind of use of the several novel features. Where the word "swing" is used in the claims, I mean to include any equivalent device for carrying a suspended load; and by the word "resilient" I mean to include elastic substances generally, which when deformed, tend to return to their original shape or dimensions.

I claim the following as my invention:

1. A parachute canopy, for tower-hung practice parachutes having a series of radially extending fabric gores connected by seams, shrouds freely disposed in some of said seams, and flexible fabric strips sewed into intervening seams to reinforce them, in combination with a spreader ring encircling the skirt of said canopy and removably connected thereto at the ends of said shrouds, said flexible fabric strips being bifurcated at their outer ends and removably connected thereby to said ring.

2. A parachute canopy, for tower-hung practice parachutes having a series of radially extending fabric gores connected by seams, a ring encircling the peak of said canopy and having secured thereto flexible fabric strips which are sewed into some of said seams, said strips having extensible portions at their outer ends in combination with a spreader ring encircling the skirt of said canopy to which the canopy is detachably connected, and guide members detachably connected to the extensible ends of said fabric strips.

3. A parachute canopy having a series of radially extending fabric gores connected by seams, and reinforcing strips sewed into some of said seams, in combination with a spreader ring encircling the skirt of said canopy and guide means connected thereto opposite said reinforced seams, detachable connections for attaching said ring and canopy and for attaching said guide means and reinforcing strips, said reinforced seams being provided with extensible connectors for taking up slack in the canopy between said peak and said guide means.

4. A parachute canopy having a series of radially extending fabric gores connected by seams, shrouds freely disposed in some of said seams, and flexible fabric strips sewed into intervening seams to reinforce them, in combination with a spreader ring encircling the skirt of said canopy and removably connected thereto at the ends of said shrouds, said flexible fabric strips being bifurcated at their outer ends and removably connected thereby to said ring, and said reinforced seams being provided with extensible connectors for taking up slack in the canopy between said peak and ring.

5. A parachute canopy, for tower-hung practice parachutes having a series of radially extending fabric gores connected by seams, a ring encircling the peak of said canopy and having secured thereto flexible fabric strips sewed into some of said seams, said strips having extensible portions at their outer ends, in combination with spreader means for the skirt of said canopy comprising guide means to which the canopy is detachably connected, and guide members detachably connected to the extensible ends of said fabric strips.

6. A captive parachute for raising and lowering, comprising a fabric canopy, means for maintaining the skirt of the canopy spread open, means at the peak of the canopy for securing a lifting cable, said canopy having a series of spaced openings of substantial length and width extending through it between its peak and skirt, and fabric covers for each of said openings, each individually secured to the canopy fabric on its under side on opposite sides of an opening to constitute a valve operable to open to relieve pressure from outside the canopy when the canopy is raised.

7. A captive parachute for raising and lowering, comprising a fabric canopy, means for maintaining the skirt of the canopy spread open, means at the peak of the canopy for securing a lifting cable, said canopy having two concentric series of spaced openings of substantial length and width extending through it between its peak and skirt, and fabric covers for each of said openings, each individually secured to the canopy fabric on its under side on opposite sides of an opening to constitute a valve operable to open to relieve pressure from outside the canopy when the canopy is raised.

8. A captive parachute for raising and lowering, comprising a fabric canopy, means for maintaining the skirt of the canopy spread open, means at the peak of the canopy for securing a lifting cable, said canopy having a series of spaced openings of substantial length and width extending through it between its peak and skirt, and pocket members covering each of said openings, each individually secured to the canopy fabric on its under side on three sides of an opening to constitute a valve operable to open to relieve pressure from outside the canopy when the canopy is raised.

9. A captive parachute canopy for raising and lowering, having a series of openings of substantial length and width spaced circumferentially between its peak and skirt, a valve cover on the under side of each opening, each cover individually secured to the canopy along its sides and lower edge, flexible strengthening members extending from peak to skirt between said openings and secured to said canopy to conform to its shape when inflated, a spreader ring encircling the skirt of the canopy, and straps detachably connecting the ends of said strengthening members to said ring.

10. A parachute canopy for captive practice parachute to be raised and lowered having a series of openings of substantial length and width spaced circumferentially between its peak and skirt, a valve cover on the under side of each opening, each cover individually secured to the canopy along its sides and lower edge, strengthening members extending from peak to skirt between said openings and secured to said canopy to conform to its shape when inflated, a spreader ring encircling the skirt of the canopy, and straps detachably connecting the ends of said strengthening members to said ring.

11. A parachute canopy having a plurality of spaced openings of substantial length and width extending through it between its peak and skirt, a fabric cover for each of said openings, each individually secured to the canopy fabric on its under side on opposite sides of the corresponding opening to constitute a valve operable to open by air pressures from outside the canopy and to prevent escape of air from the interior of the canopy.

12. In a parachute canopy for captive practice parachutes to be raised and lowered having fabric sections connected by radial seams, openings of substantial length and width in some of the sections between the seams, a fabric cover for each of said openings individually secured on the under side of the canopy at opposite margins to position them across said openings, respectively, at least one marginal edge of each such cover being free to permit passage of air through and under said canopy from the outside, whereby said covers and openings constitute valves for relieving pressure upon said canopy when being raised.

13. A fabric parachute canopy having a plurality of apertures equally spaced from the edge of the canopy, such apertures being of predetermined area, and valve means for the apertures for admitting air into the canopy when the pressure outside the canopy exceeds the inside pressure, said valve means including an additional fabric strip for each apertures of greater area than the area of the aperture and secured to the canopy crosswise of the aperture it covers along opposite side edges of the fabric strip, said fabric strip being actuated to close the aperture by pressing therearound when the pressure inside the canopy exceeds the external pressure and to open the aperture to admit air into the canopy when the external pressure is greater.

JAMES H. STRONG.